United States Patent [19]

Inagaki

[11] Patent Number: 4,773,671

[45] Date of Patent: Sep. 27, 1988

[54] METHOD OF CONTROLLING DAMPING FORCE OF DAMPER

[75] Inventor: Hiromi Inagaki, Saitama, Japan

[73] Assignee: Honda Giken Kogyo Kabushiki Kaisha, Tokyo, Japan

[21] Appl. No.: 16,841

[22] Filed: Feb. 20, 1987

[30] Foreign Application Priority Data

Feb. 21, 1986 [JP] Japan ................................. 61-36599

[51] Int. Cl.⁴ ........................ B60G 17/00; B60G 17/06
[52] U.S. Cl. ..................................... 280/707; 188/299
[58] Field of Search ..................... 280/702, 703, 707; 188/266, 282, 285, 314, 318, 299

[56] References Cited

U.S. PATENT DOCUMENTS

| | | | |
|---|---|---|---|
| 4,655,440 | 4/1987 | Eckert | 280/707 |
| 4,666,180 | 5/1987 | Shirakuma | 280/707 |
| 4,678,203 | 7/1987 | Rohner et al. | 280/707 |
| 4,682,675 | 7/1987 | Eddy, Jr. | 280/707 |
| 4,691,284 | 9/1987 | Izumi et al. | 280/707 |

FOREIGN PATENT DOCUMENTS

| | | |
|---|---|---|
| 203517 | 10/1985 | Japan . |
| 209310 | 10/1985 | Japan . |
| 1518 | 1/1986 | Japan . |

*Primary Examiner*—Richard A. Bertsch
*Attorney, Agent, or Firm*—Lyon & Lyon

[57] ABSTRACT

The damping force of a damper on a motor vehicle is automatically controlled dependent on the running condition of the motor vehicle and the road condition in which the motor vehicle travels. An acceleration of vertical vibration of the motor vehicle body is detected by a sensor, and a binary pulse signal indicative of a variation in the acceleration is produced. Then, a first signal is generated on the basis of whether the pulse duration of the binary pulse signal is at least a prescribed value or smaller than the prescribed value. Thereafter, a second signal is produced indicating the magnitude of the absolute value of the acceleration. Finally, the damping force of the damper is selectively adjusted to hard, normal, and soft settings based on a combination of the first and second signals.

4 Claims, 3 Drawing Sheets

METHOD OF CONTROLLING DAMPING FORCE OF DAMPER

BACKGROUND OF THE INVENTION

1. Field of the Invention

The present invention relates to a method of automatically controlling the damping force of a damper equipped in a motor vehicle dependent on the running condition of the motor vehicle and the road condition in which the motor vehicle travels.

2. Description of the Prior Art

The prior art includes known apparatus for automatically or manually adjusting the damping force of a damper to increase the riding comfort and stable maneuverability of a motor vehicle such as an automobile.

Japanese Laid-Open Patent Publications Nos. 60(1985)-203517 and 60(1985)-209310 disclose methods of automatically controlling the damping force of a damper mounted in a motor vehicle. According to the disclosed methods, the running condition of the motor vehicle as it varies with driver's operation such as braking, steering, or motor vehicle speed is detected, and the damping force is controlled dependent on the detected running condition. Japanese Laid-Open Patent Publication No. 61(1986)-1518 shows an apparatus for controlling the damping force of a damper dependent on the road condition in which a motor vehicle runs, based on detected acceleration of vertical vibration of a motor vehicle body in addition to braking and vehicle speed.

Various mechanisms for adjusting the damping force have been employed in the above automatic control systems. In one of such adjusting mechanisms, an adjusting rod inserted through a hollow piston rod is rotated or moved upwardly and downwardly thereby to vary the cross-sectional area of an orifice through which working oil flows.

The damping force control methods disclosed in Publication Nos. 60(1985)-203517 and 60(1985)-209310 have proven unsatisfactory since the damping force is not variably controlled dependent on the road condition. While the system shown in Publication No. 61(1986)-1518 is capable of controlling the damping force dependent on the road condition by using a sensor for detecting the acceleration of vertical vibration of the motor vehicle body, the system requires many sensors and a complex control circuit inasmuch as braking and vehicle speed have to be detected in addition to the acceleration of vertical vibration.

SUMMARY OF THE INVENTION

It is an object of the present invention to provide a method of automatically controlling the damping force of a damper dependent on the running condition of a motor vehicle and the road condition in which the motor vehicle runs, through a simple arrangement using only a sensor for detecting acceleration of vertical vibration of a motor vehicle body.

According to the present invention, there is provided a method of controlling the damping force of a damper mounted on a motor vehicle body, comprising the steps of comparing an acceleration of vertical vibration of the motor vehicle body detected by a sensor with a first value G1 and producing a binary pulse signal indicative of a variation in the acceleration, producing a first signal which is of an "H" level when the pulse duration of the binary pulse signal is at least a prescribed value To and of an "L" level when the pulse duration of the binary pulse signal is smaller than the prescribed value To, producing a second signal which is of an "H" level when the absolute value of the acceleration is at least a second value G2 and of an "L" level when the absolute value of the acceleration is smaller than the second value G2, and selectively adjusting the damping force of the damper to hard, normal, and soft settings based on a combination of the first and second signals.

The above and further objects, details and advantages of the present invention will become apparent from the following detailed description of a preferred embodiment thereof, when read in conjunction with the accompanying drawings.

DETAILED DESCRIPTION OF THE PREFERRED EMBODIMENT

Figure 1:
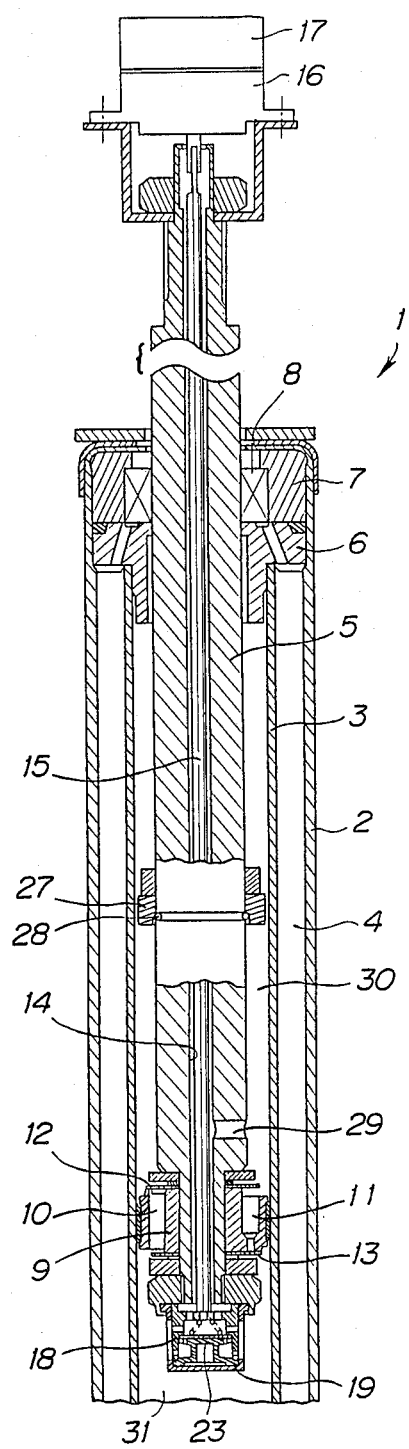
FIG. 1 is a fragmentary longitudinal cross-sectional view of a variable-damping-force damper for carrying out a method of the present invention.
Figure 2:
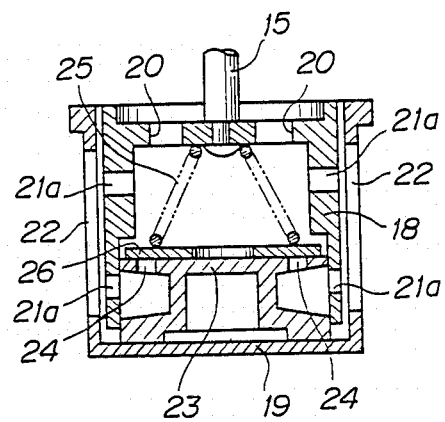
FIG. 2 is a longitudinal cross-sectional view of a selector valve of the damper.
Figure 3:
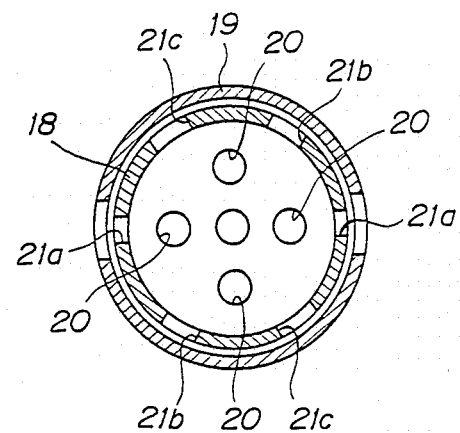
FIG. 3 is a transverse cross-sectional view of the selector valve.

A hydraulic damper with variable damping forces will first be described with reference to FIGS. 1 through 3. The damper, generally designated by the reference number 1, includes a bottom case 2 and a cylinder 3 disposed within the bottom case 2, with an oil chamber 4 defined between the bottom case 2 and the cylinder 3. A hollow piston rod 5 is inserted, from above, into the cylinder 3 through an oil seal 8 retained by a rod guide 6 and a rod guide case 7. The hollow piston rod 5 has a smaller-diameter lower end to which there is fixed a piston 9 held in slidable contact with the inner peripheral surface of the cylinder 3. The piston 9 has axial oil holes 10, 11 extending between upper and lower surfaces thereof to which leaf valves 12, 13 are attached, respectively.

The piston rod 5 has an axial through hole 14 through which an adjusting rod 15 rotatably extends. To the upper end of the adjusting rod 15, there are coupled a potentiometer 16 for detecting the rotational angle or angular displacement of the adjusting rod 15 and an actuator 17 for rotating the adjusting rod 15 abdut its own axis. The adjusting rod 15 has a lower end projecting from the piston rod 5 and coupled to a selector valve 18.

The selector valve 18 is of a cylindrical shape housed in a valve casing 19 and is secured to the adjusting rod 15 below the piston 9. As shown in FIGS. 2 and 3, the selector valve 18 has four angularly equally spaced oil holes 20 defined in an upper wall thereof and diametrically opposite orifices 21a, 21b, 21c defined in a cylindrical wall thereof. As illustrated in FIG. 2, the orifices 21a, 21b, 21c are defined as upper and lower spaced pairs. The orifices 21a have smaller orifice sizes or cross-sectional areas, the orifices 21b have intermediate orifice sizes or cross-sectional areas, and the orifices 21c have larger orifice sizes or cross-sectional areas. The valve casing 19 includes a cylindrical wall having a pair of vertically elongate oil holes 22 defined therein in diametrically opposite relation. A valve seat 23 disposed in the selector valve 18 has oil holes 24. A check valve 26 is disposed in the selector valve 18 and normally urged by a spring 25 to be seated on the valve seat 23.

A stopper 27 is disposed around and locked on the piston rod 5 by a retaining ring or circlip 28. The piston rod 5 has a radial oil hole 29 (FIG. 1). The cylinder 3 defines therein upper and lower chambers 30, 31 divided by the piston 19 and held in communication with each other through the oil hole 29 and the through hole 14 in the piston rod 5.

When the damper is compressed, the piston 9 is moved downwardly (FIG. 1) with respect to the cylinder 3. A portion of working oil in the oil chamber 31 flows through the oil hole 10 in the piston 9 into the oil chamber 30 while forcing the leaf valve 12 upwardly. Another portion of the working oil passes from the oil chamber 31 through the oil holes 22 in the valve casing 19, one of the upper pairs of orifices 21a, 21b, or 21c of the selector valve 18, the holes 20, the through hole 14 in the piston rod 5, and the oil hole 29 into the oil chamber 30. When the speed of movement of the piston 9 becomes higher than a certain speed during the compression stroke, the check valve 26 is pushed upwardly by oil pressure, allowing the working oil to flow additionally through one of the lower pairs of the orifices.

In an extension stroke, the piston 9 is moved upwardly. A portion of working oil in the oil chamber 30 flows through the oil hole 11 in the piston 9 into the oil chamber 31 while depressing the leaf valve 13. Another portion of the working oil from the oil chamber 30 flows from the oil chamber 30 through the oil hole 29, the through hole 14, the oil holes 20, the orifices 21a, 21b, or 21c and the oil holes 22 into the oil chamber 31. Since the check valve 26 closes the oil holes 24 of the valve seat 23 at this time, the oil flows only through the upper pairs of the orifices.

Figure 4:
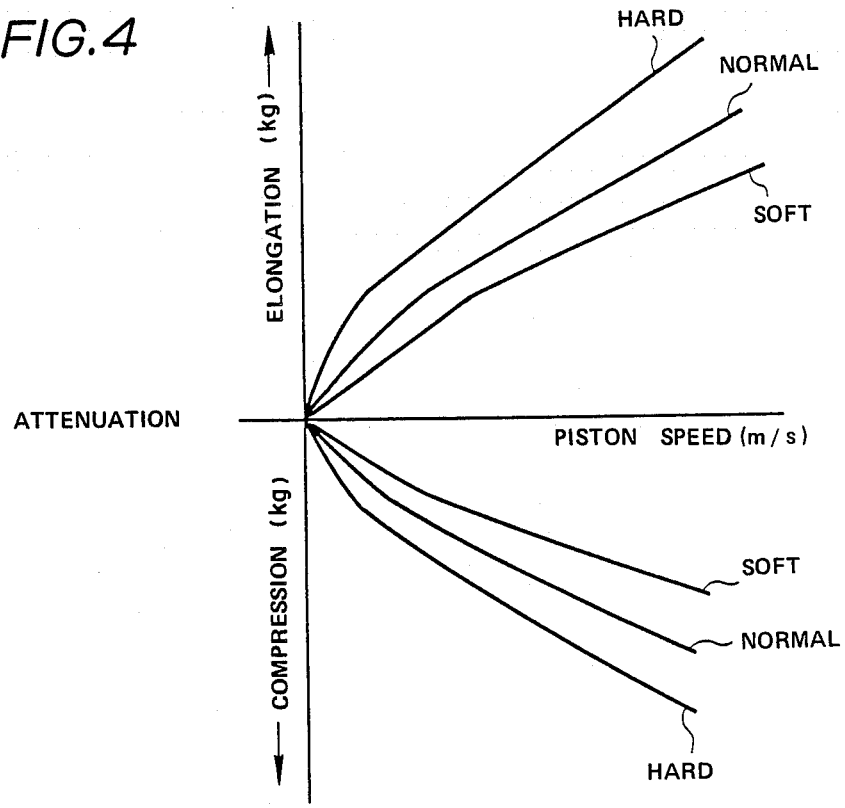
FIG. 4 is a graph showing the relationship between piston speeds and damping forces.

The damper 1 produces a damping force due to resistance to which the working oil is subjected when passing through the orifices. The damping force is larger when the adjusting rod 15 is turned to bring the orifices 21a into alignment with the oil holes 22. The damping force is of a medium level when the orifices 21b are aligned with the oil holes 22. The damping force is of a smaller level when the orifices 21c are aligned with the oil holes 22. The different damping force levels correspond respectively to hard, normal, and soft settings of the damper 1, as shown in FIG. 4.

Figure 5:
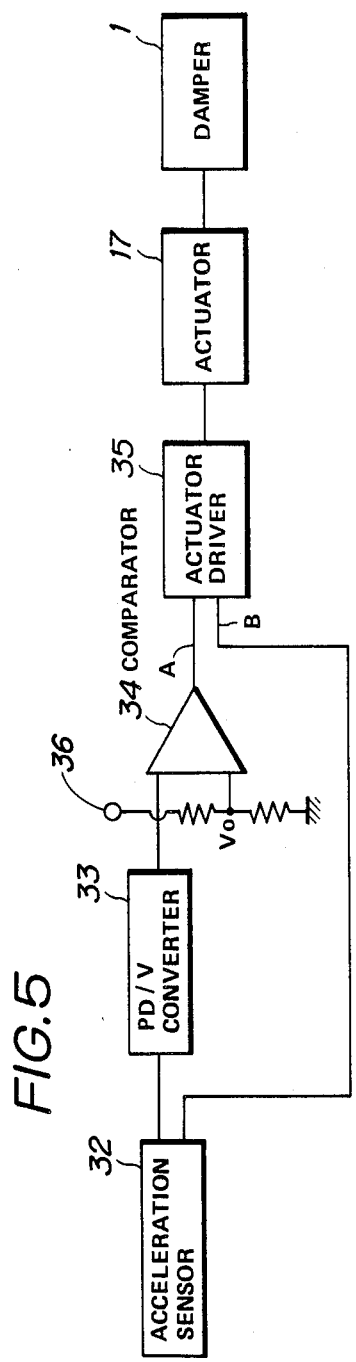
FIG. 5 is a block diagram of a control circuit.
Figure 6:
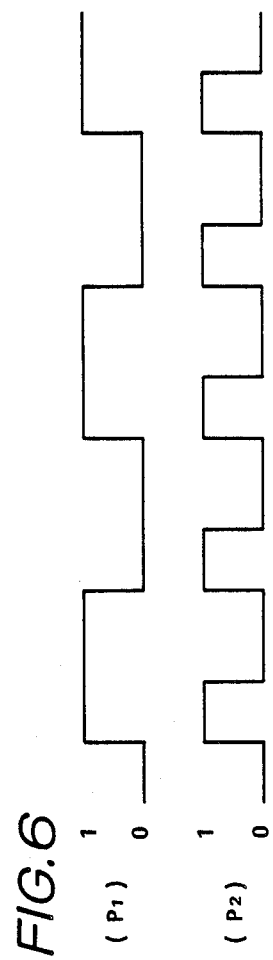
FIG. 6 is a diagram showing two pulse signals produced by an acceleration sensor.

A method of controlling the damping force, using the variable-damping force hydraulic damper 1, will be described below with reference to FIGS. 5 and 6. A control circuit for carrying out the method includes a sensor 32 for detecting acceleration |G| of vertical vibration of a motor vehicle body, a converter 33 for converting a pulse duration to a voltage (PD/V converter), a comparator 34, an actuator driver 35, and a power source 36. The acceleration sensor 32 produces an output pulse signal which is of a level "1" when the acceleration detected by the acceleration sensor 32 is equal to or higher than a predetermined value G1, and of a level of "0" when the detected acceleration is lower than such a value G1. The sensor 32 applies such a pulse signal to the PD/V converter 33 which converts the pulse duration to a corresponding voltage. The voltage from the PD/V converter 33 is compared with a prescribed voltage Vo by the comparator 34. The comparator 34 then applies a first binary signal A to the actuator driver 35, the first binary signal A being of a level "$H_A$" when the compared voltage is equal to or higher than the voltage Vo as shown at P1 in FIG. 6, and of a level "$L_A$" when the compared voltage is lower than the voltage Vo as shown at P2 in FIG. 6.

The actuator driver 35 is also supplied with a second signal B from the acceleration sensor 32. The second signal B is a binary signal which is of a level "$H_B$" when the acceleration |G| is equal or higher than a prescribed value G2 that is greater than the value G1, and of a level "$L_B$" when the acceleration |G| is lower than the value G2.

The acutator driver 35 applies an operation signal to the actuator 17 according to the following table:

| Conditions | 1 | 2 | 3 | 4 |
|---|---|---|---|---|
| Signal A | $H_A$ | $H_A$ | $L_A$ | $L_A$ |
| Signal B | $H_B$ | $L_B$ | $H_B$ | $L_B$ |
| Damping force | Hard | Normal | Normal | Soft |

In the condition 1, it is assumed that since the signal A is of the level $H_A$, the pulse duration of the pulse signal from the acceleration sensor 32 is larger and the motor vehicle runs at a high speed on a relative good road, or the motor vehicle is being braked, and that since the signal B is of the level $H_B$, the acceleration |G| is large and the motor vehicle body moves up and down to a large extent. Therefore, the damping force is selected to be of the hard setting. In the condition 2, the damping force is of the normal setting because the signal B is of the level $L_B$, i.e., the vertical movement of the motor vehicle body is small, though the signal A is of the level $H_A$. In the condition 3, the vertical movement of the motor vehicle body is large since the signal B is of the level $H_B$, but the pulse duration of the pulse signal from the acceleration sensor 32 is small because the signal A is of the level $L_A$. As it is assured that the motor vehicle is running at a low or medium speed on a bad road, the damping force is selected to be of the normal setting. In the condition 4, the motor vehicle is assumed to be running at a low speed on a relatively good road since the signal A is of the level $L_A$ and the signal B is of the level $L_b$. Therefore, the damping force is selected to be of the soft setting for better riding comfort.

With the arrangement of the present invention, it is possible to control the damping force based on the braking condition and speed of travel as well as the vertical movement of the motor vehicle body. The apparatus required for effecting such damping force control may be simple because only the acceleration sensor is necessary and no other sensors are necessary.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

I claim:

1. A method of controlling the damping force of a damper mounted on a motor vehicle body, comprising the steps of:

comparing an acceleration of vertical vibration of the motor vehicle body detected by a sensor with a first value G1 and producing a binary pulse signal indicative of a variation in the acceleration;

producing a first signal which is of an "H" level when the pulse duration of said binary pulse signal is at least a prescribed value To and of an "L" level when the pulse duration of said binary pulse signal is smaller than said prescribed value To;

producing a second signal which is of an "H" level when the absolute value of said acceleration is at least a second value G2 and of an "L" level when the absolute value of said acceleration is smaller than said second value G2; and selectively adjusting the damping force of the damper to hard, normal, and soft settings based on a combination of said first and second signals.

2. A method according to claim 1, wherein the hard setting is selected when said first signal is of the "H" level and said second signal is of the "H" level, the soft setting is selected when said first signal is of the "L" level and said second signal is of the "L" level, and the normal setting is selected otherwise.

3. A method according to claim 1, wherein said first signal is determined in level by converting the pulse duration of said binary pulse signal to a voltage and comparing said voltage with a prescribed voltage Vo.

4. A method according to claim 1, wherein said second value G2 is larger than said first value G1.

* * * * *